(12) United States Patent
Warner (10) Patent No.: US 8,675,812 B1
(45) Date of Patent: Mar. 18, 2014

(54) SERIAL-IN PARALLEL-OUT SHIFT REGISTERS WITH ENHANCED FUNCTIONALITY

(71) Applicant: Richard C. Warner, Lincolnshire, IL (US)

(72) Inventor: Richard C. Warner, Lincolnshire, IL (US)

(\*) Notice: Subject to any disclaimer, the term of this patent is extended or adjusted under 35 U.S.C. 154(b) by 0 days.

(21) Appl. No.: 13/645,129

(22) Filed: Oct. 4, 2012

(51) Int. Cl.
*G11C 19/00* (2006.01)

(52) U.S. Cl.
USPC .............................................. 377/67; 377/54

(58) Field of Classification Search
None
See application file for complete search history.

(56) References Cited

U.S. PATENT DOCUMENTS

| 4,429,300 | A | | 1/1984 | Yamasawa | |
|---|---|---|---|---|---|
| 5,223,833 | A | \* | 6/1993 | Akata | 341/100 |
| 5,230,014 | A | | 7/1993 | Benhamida | |
| 5,717,351 | A | \* | 2/1998 | Katsutani | 327/108 |
| 7,254,206 | B2 | \* | 8/2007 | Chiang | 375/371 |
| 7,423,563 | B2 | \* | 9/2008 | Zucker | 341/100 |
| 7,746,251 | B2 | \* | 6/2010 | Gonzalez | 341/100 |
| 8,250,421 | B2 | \* | 8/2012 | Whetsel | 714/731 |
| 2003/0193424 | A1 | \* | 10/2003 | Chiang | 341/100 |

OTHER PUBLICATIONS

European Patent Office, International Search Report and Written Opinion of the International Searching Authority issued in corresponding PCT Application, International Application No. PCT/US2013/062593, Dec. 12, 2013.

\* cited by examiner

*Primary Examiner* — Tuan T Lam (74) *Attorney, Agent, or Firm* — Patzik, Frank & Samotny Ltd.

(57) ABSTRACT

A configuration of logic elements enables existing Serial-In-Parallel-Out (SIPO) shift registers to perform their own bit count, report the receipt of a valid transmission consisting of an expected number of bits and report the receipt of an invalid transmission consisting of greater than the expected number of bits. Logic elements additional to the foregoing enable SIPO shift registers to receive valid transmissions of varying expected numbers of bits. Special purpose integrated circuits (ICs) are disclosed which also contain the aforementioned configurations of logic elements. Newly designed SIPO shift registers which contain within them the foregoing configurations of logic elements are further disclosed. Potential messages of multiple acceptable message lengths are accommodated. Some embodiments are equipped with tri-state data outputs.

8 Claims, 9 Drawing Sheets

SERIAL-IN PARALLEL-OUT SHIFT REGISTERS WITH ENHANCED FUNCTIONALITY

BACKGROUND OF THE INVENTION

1. Field of the Invention

The present invention relates, in general, to the transmission of binary data between digital devices, and, more particularly, to enabling existing and newly designed serial-in-parallel out (SIPO) shift registers to perform their own bit count, report the receipt of valid transmissions of various expected lengths, and report the receipt of certain invalid transmissions.

2. Description of Related Art

Digital data is often transmitted serially between digital devices via a combination of transmitting Parallel-In-Serial-Out (PISO) and receiving SIPO shift registers. It is prudent for a receiving SIPO shift register to report and verify that it has received a valid transmission of some expected number of bits—i.e., a packet or message of a particular, predetermined length. To this end, SIPO shift registers often operate in conjunction with an associated binary counter uniquely designed to report receipt of the expected number of bits of a message transmission. In general, there are several difficulties and shortcomings in current approaches to this requirement. First, there is the need to design a unique counter for each application, dependent on the expected length of transmissions. There is also the need to provide the flip-flops and one or more gates needed to equip the counter, and to report and verify receipt of a transmission of the expected number of bits. This, in turn, requires supplying additional surface area on a printed circuit card in order to mount the counter components. Such additional components increase the power used and heat generated the overall circuitry. Moreover, these additional components increase the amount of printed traces, or circuit wiring, required on a printed circuit card on which all of these components are mounted.

For certain applications, it may be desirable to send transmissions of varying numbers of expected bits. This raises additional problems. First, this can require adding a second SIPO shift register for the second potential message length, having the same issues described above.

Accordingly, it is an object of the present invention to supply a single design requiring few components, applicable to SIPO shift registers of any number of bits, that eliminates the need to design a unique associated bit counter for each different expected number of bits transmitted.

It is another object of the present invention to reduce to a single integrated circuit, or to eliminate the external components required to perform, the bit count and other functions and to enable a SIPO shift register to receive transmissions of more than one expected length.

It is yet another object of the present invention to reduce the required area of a printed circuit card required to mount the external components associated with a SIPO shift register.

It is still another object of the present invention to reduce the amount of power used and heat generated, by reducing the number of digital logic components required to perform the counting and other functions commonly associated with a SIPO shift register.

It is a further object of the present invention to reduce the amount of printed wiring on a printed circuit card incorporating one or more SIPO shift registers.

It is an additional object of the present invention to eliminate or reduce the need for multiple SIPO shift registers in applications having digital message transmissions of more than one predetermined bit length.

These and other objects and features of the present invention will become apparent in view of the present specification, drawings and claims.

BRIEF SUMMARY OF THE INVENTION

In accordance with the several embodiments of this invention, logic components are assembled in configurations that enable existing and newly designed SIPO shift registers to perform their own bit count, report the receipt of valid and/or certain invalid transmissions, and accept transmissions of expected differing lengths. The logic configurations of this invention are developed first in the form of discrete components, secondly in the form of special purpose integrated circuits, and thirdly as part and parcel of newly designed SIPO shift registers.

DETAILED DESCRIPTION OF THE INVENTION

While several different embodiments of the present invention are described herein and shown in the various figures, common reference numerals in the figures denote similar or analogous elements, components or structure amongst the various embodiments.

Figure 1:
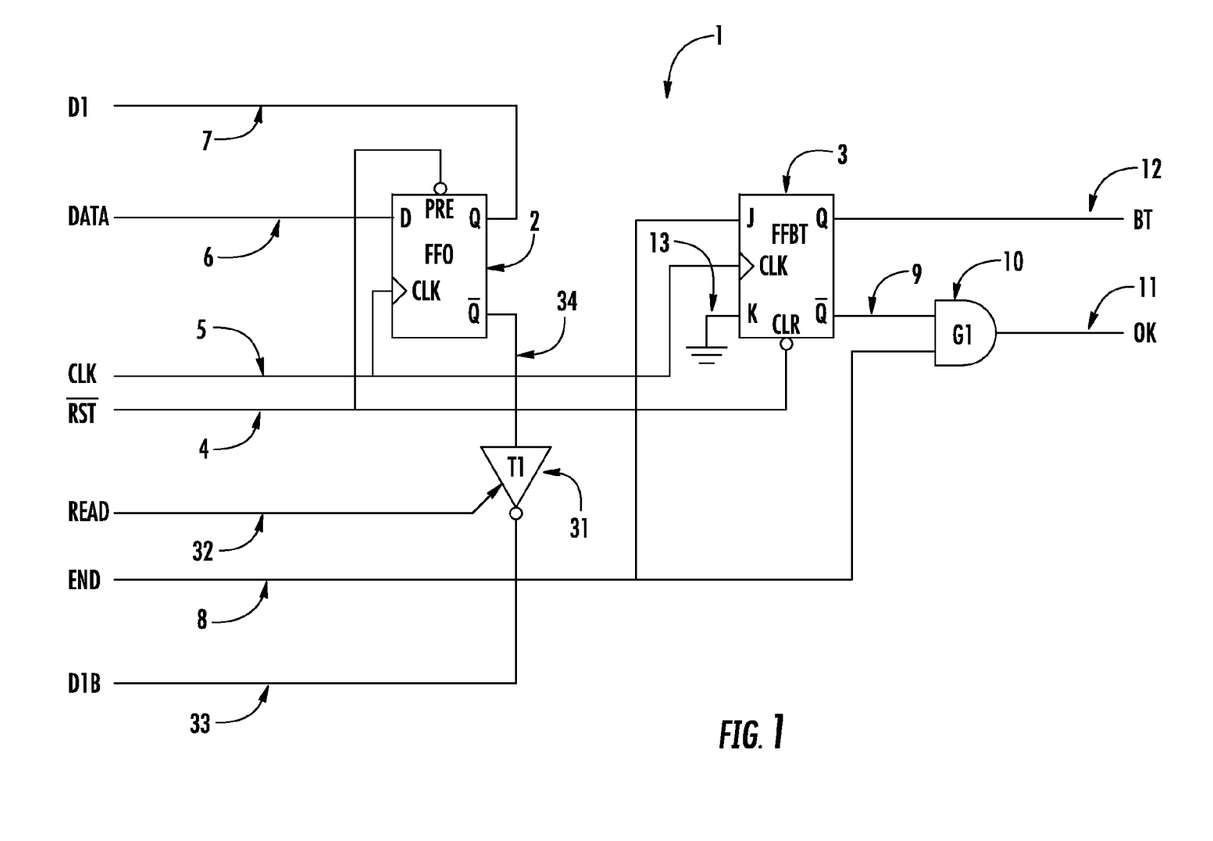
FIG. 1 is schematic diagram of a first embodiment of the present invention.

A first embodiment 1 of the present invention, in the form of discrete components enabling an existing SIPO shift register to perform its own bit count, report the receipt of transmissions of some valid expected length and report the receipt of certain invalid transmissions of greater than the expected length, is shown in FIG. 1 as comprising D-type flip-flop FF0 2, JK-type master-slave Bad Transmission flip-flop FFBT 3, inverted active reset signal RST 4, clock signal CLK 5, data input (from transmitting circuitry) DATA 6, D1 signal 7, END signal 8, OK control signal 9, AND gate G1 10, OK signal 11, Bad Transmission (BT) signal 12, FFBT K input 13, tri-state driver 31, READ command 32, and D1B signal 33. Flip-flop FF0 2 is initially preset to a logic 1 value to establish the End of Transmission Marker (ETM).

Flip-flop FFBT 3 is set whenever an invalid transmission, being too many bits in length, is received, as output and reported by BT signal 12. In the various embodiments of the present invention, including the embodiment of FIG. 1, inverted logic reset signal 4 is employed to reset all circuitry, on both integrated circuits and SPIO shift registers, with the exception of certain components of the fifth, sixth and seventh embodiments of the present invention. Clock signal CLK 5 is the data transmission clock accompanying data input signal DATA 6, and clocks both flip-flop DD0 2 and flip-flop FFBT 3. Signal D1 7 is output from flip-flop FF0 2, is initially set to a logic 1 value to establish the End of Transmission Marker (ETM), and finally contains the last bit of the transmitted sequence. END signal 8 signifies receipt of a complete transmission, and is coupled to both the J input of both Bad Transmission flip-flop FFBT 3 and one input of AND gate 10. The other input of AND gate G1 10 is OK control signal 9, output from Bad Transmission flip-flop FFBT 3. OK control signal 9 selectively enables or cuts off AND gate G1 and its output, OK signal 11, which signifies receipt of a valid overall transmission.

BT signal 12, output from Bad Transmission flip-flop FFBT 3, reports the receipt of a bad serial data transmission, composed of too many bits in length. Grounded K input 13 of flip-flop FFBT 3 prevents the resetting of flip-flop FFBT 3 as this flip-flop's clock input is pulsed. This embodiment is equipped with a tri-state driver for use when the invention is applied to an existing SIPO shift register with tri-state data outputs. In particular, inverting tri-state driver 31, controlled by READ command 32, receives the inverted output 34 from flip-flop FF0 2, and provides a buffered tri-state output D1B 33 having the same logic state as D1 signal 7.

Figure 2:
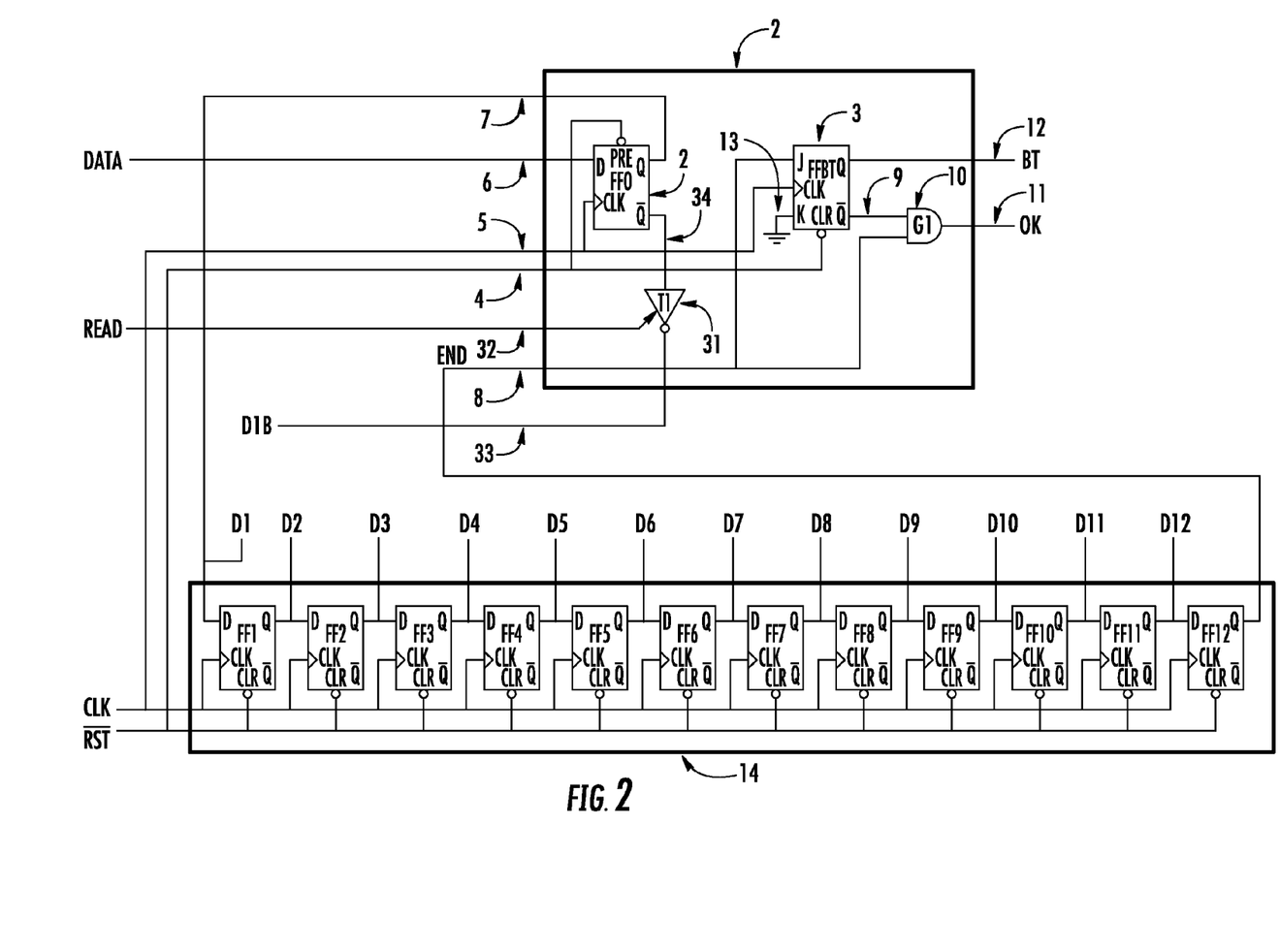
FIG. 2 is a schematic diagram of a second embodiment of the present invention.

Referring to FIG. 2, a second embodiment of the invention, wherein the first embodiment of the invention is incorporated into a special purpose integrated circuit, is shown applied to an arbitrarily selected, existing SIPO shift register 14. Although, in the example of FIG. 2, a 12-bit SIPO shift register is shown, the present invention is capable of operation in conjunction with shift registers of any arbitrary length. The connecting leads between the special purpose integrated circuit 1 and SIPO shift register 14 of FIG. 2 are as follows: RST signal 4 presets flip-flop FF0 2 to the logic 1 state, hereby establishing the ETM, and resets flip-flop FFBT 3 and all stages of SIPO shift register 14 to the logic 0 state. If tri-state driver 31 is not used, its READ control signal 32 is coupled to logic ground or is otherwise brought to a logic 0 state. CLK signal 5 clocks incoming data into flip-flop FF0 2 and advances the ETM and data from flip-flop FF0 2 to and through SIPO shift register 14. DATA signal 6 brings in data from the transmitting source. D1 signal 7 is the Q output of flip-flop FF0 2 and the means by which the ETM and input data are advanced to the SIPO shift register 14. Signal D1 7 also becomes the last bit of data transmitted for a valid transmission. END signal 8 indicates that a valid transmission of the expected number of bits has been received. END signal 8 may be connected to any desired D output along the length of SIPO shift register 14, thereby selecting for expected transmissions of a length shorter than the physical length of SIPO shift register 14.

As shown in FIG. 2, CLK signal 5 and inverted active RST signal 4 are coupled to both the circuitry 1 of the first embodiment of the invention, as well as to the clock and reset signals, respectively, of existing SIPO shift register 14. Signal D1 7, output from flip-flop FF0 2, is coupled to the D1 input of existing SIPO shift register 14. The Q output of the final flip-flop FF12 of existing SIPO shift register 14 is coupled to END signal 8 of the circuitry 1 of the first embodiment of the invention.

Figure 3:
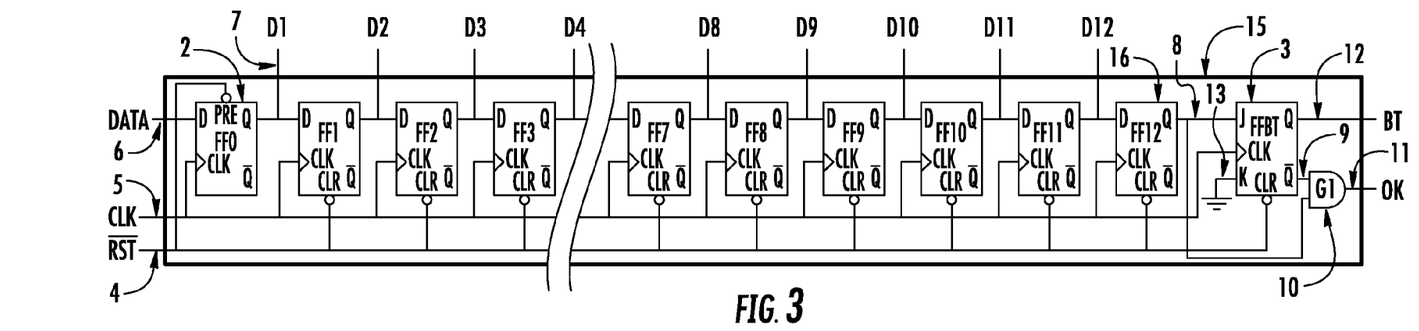
FIG. 3 is a schematic diagram of a third embodiment of the present invention.

A newly designed SIPO shift register 15 incorporating the novel features of the present invention is shown in FIG. 3. As can be seen, this particular embodiment does not include the tri-state output gate 31. Moreover, while a 12-bit SIPO shift register incorporating the present invention is shown in FIG. 3, shift registers of any arbitrary length may be constructed to include the features of the present invention. In this embodiment, flip-flop FF0 2 is shown logically positioned at the beginning of the daisy-chained flip-flops FF2 through FF12, and flip-flop FFBT 3 is positioned following flip-flop FF12 16. END signal 8 is again derived from the Q output of flip-flop FF12. Moreover, while the example of FIG. 3 does not include a tri-state output driver, all data outputs, D1 through D12 may optionally be equipped with tri-state outputs.

Figure 4:
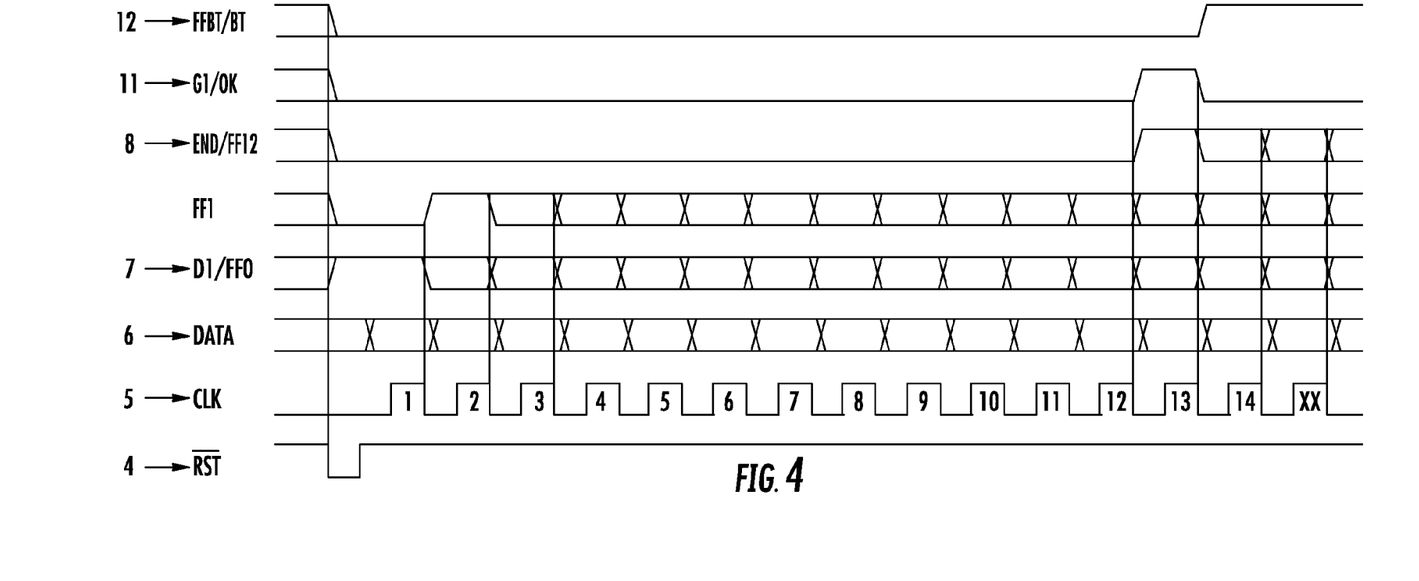
FIG. 4 is a timing diagram of the sequential operation of the circuitry of the embodiments of FIGS. 1-3.

A common timing diagram illustrating the sequential operation of the circuitry of the embodiments shown in FIGS. 1 through 3 is shown in FIG. 4. Referring to FIG. 4, preparation for the receipt of a transmission starts when RST signal 4 goes to the logic 0 state, presetting flip-flop FF0 2 and its Q output D1 7 to the logic 1 state, thus establishing the ETM and resetting all other flip-flops of SIPO shift registers 14 and 15, as applicable to the embodiment of the invention being considered. This resetting also resets the END 8 signal and the two-input AND gate G1 10, and its output lead OK 11, to the logic 0 state.

Transmission begins when the transmitting device has set the first data bit DATA 6 on-line and sends the first clock pulse CLK 5, thus validating the data. The first CLK 5 pulse clocks new DATA 6 into flip-flop FF0, and advances the ETM from flip-flop FF0 2 to flip-flop FF1 of the SIPO shift register, 14 or 15, as applicable. Successive CLK 5 pulses continue to advance the ETM until it reaches the particular SIPO shift register flip-flop that has been preselected to determine the expected length of transmission (FF12 of SIPO shift register 14 or 15 in the embodiments illustrated by FIG. 4), where it indicates the receipt of a valid transmission of the expected number of bits. Moreover, in the embodiments illustrated by FIG. 4, the output of flip-flop FF12, END signal 8, now in the logic 1 state, is the ETM. At this time inverted Q output signal 9 of flip-flop FFBT 3 is in the logic 1 state. The combination of END signal 8 and inverted Q output signal 9 of flip-flop FFBT 3, both in the logic 1 state, collectively drive 2-input AND gate G1 10 and its output, OK 11, to the logic 1 state, thereby reporting the receipt of a valid transmission. The transmitted data is available on output signals D1 7 through D12. The receipt of any additional CLK 5 pulses will drive flip-flop FFBT 3 and its Q output, BT 12, to the logic 1 state, indicating receipt of a bad transmission consisting of too many bits. The inverted Q output signal 9 of flip-flop FFBT 3 transitions to the logic 0 state, driving two-input AND gate G110 and its output to the logic 0 state, thereby terminating OK signal 11. Flip-flop FFBT 3, once set to the logic 1 state, cannot be reset by a successive CLK 5 pulse, inasmuch as its K input 13 is connected to logic ground.

Figure 5:
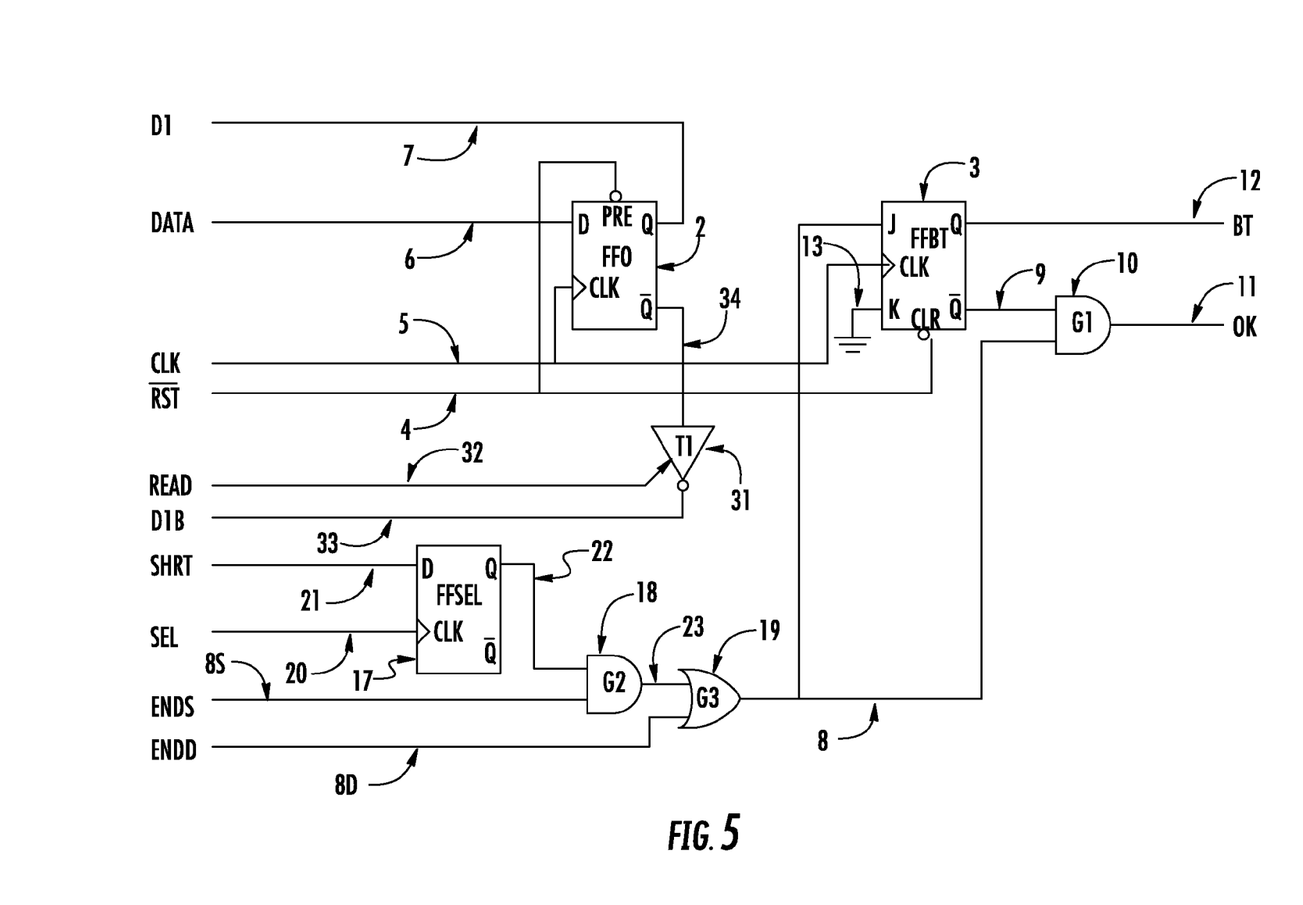
FIG. 5 is a schematic diagram of a fourth embodiment of the present invention.

A fourth embodiment of the present invention, in the form of a special purpose integrated circuit in which additional discrete logic components have been added to the logic configuration of the previously described embodiments, is shown in FIG. 5. In this embodiment, the circuitry again enables an existing SIPO shift register to perform the functions afforded by the previously described embodiments, and, additionally, permits the SIPO shift register to receive and report the validity of transmissions of differing expected lengths.

Referring to FIG. 5, this additional circuitry comprises D-type flip-flop FFSEL 17, AND gate G2 18, OR gate G3 19, input signal SEL 20, input signal SHRT 21, input signal ENDS 8S, and input signal ENDD 8D.

Figure 6:
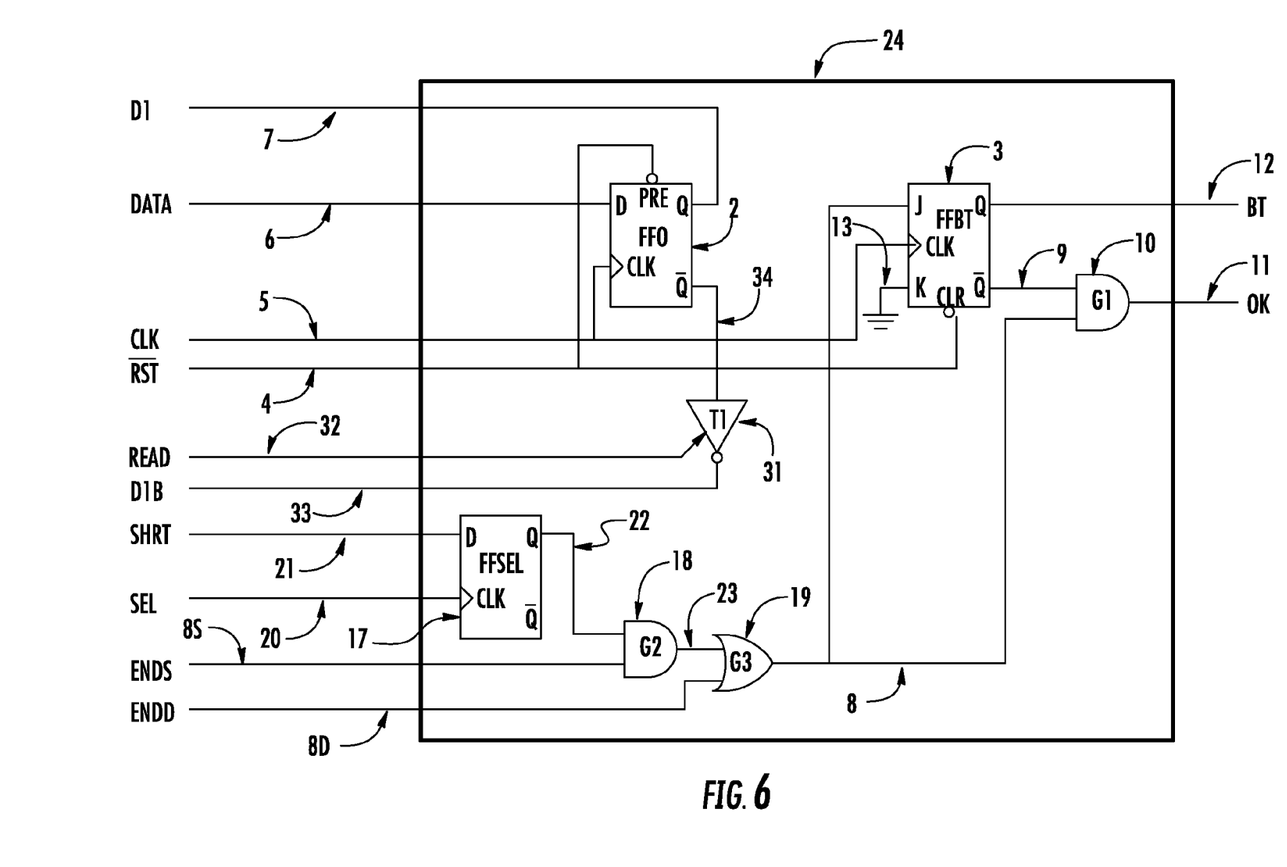
FIG. 6 is a schematic embodiment of a fifth embodiment of the present invention.
Figure 7:
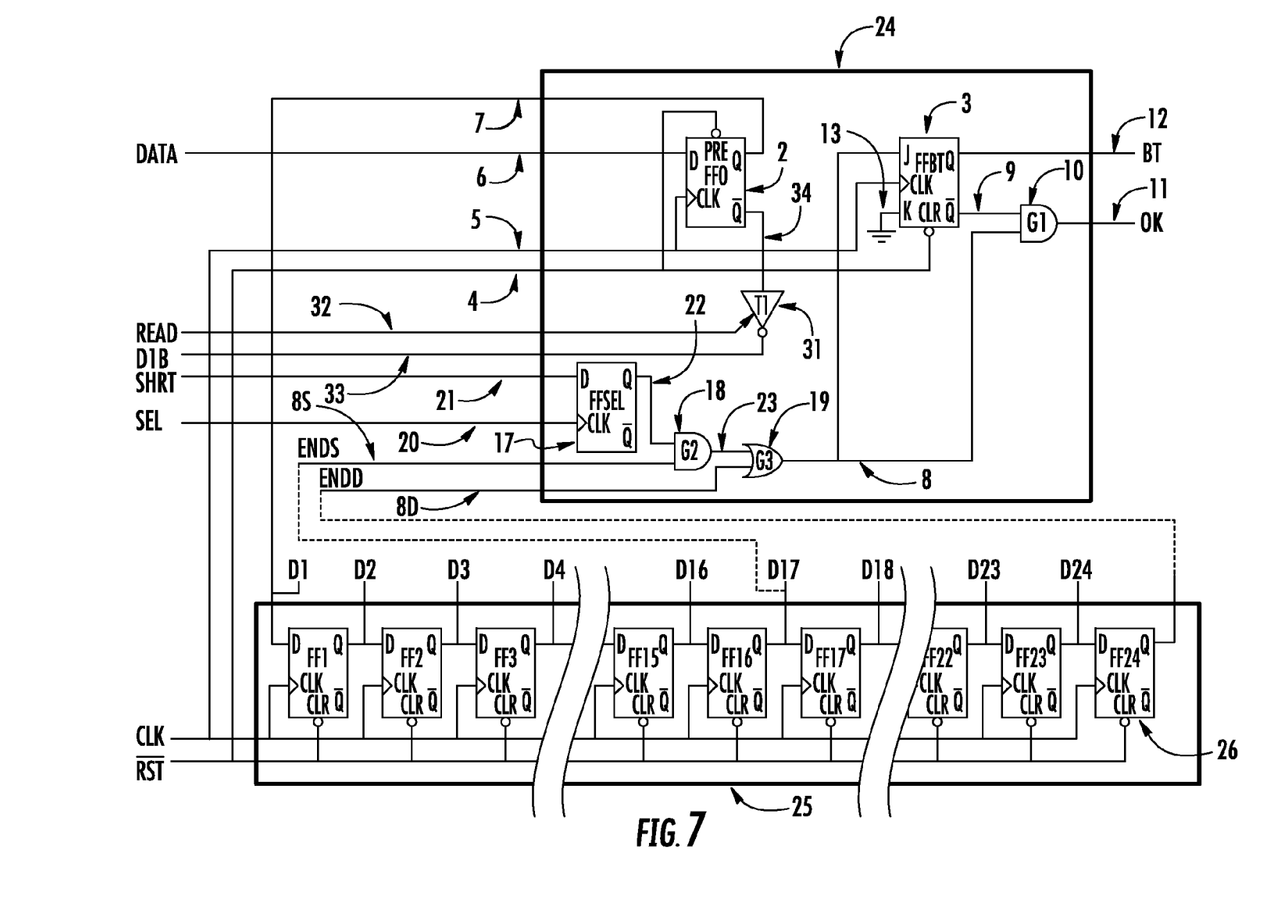
FIG. 7 is a schematic diagram of an application of the embodiment of FIG. 6.

A fifth embodiment of the present invention, in which the discrete components of the fourth embodiment are incorporated in the form of a special purpose integrated circuit 24, is shown in FIG. 6. An illustration of an application of the special purpose integrated circuit 24 of the fifth embodiment of the invention, shown applied to an arbitrarily selected, existing SIPO shift register 25, is shown in FIG. 7. In this embodiment, CLK input 5 and inverted active RST signal 7 are coupled to both integrated circuit 24 and SIPO shift register 25. Moreover, in the example of FIG. 7, ENDS signal 8S, corresponding to the anticipated short message length of 16 bits, is coupled to output D17 of SIPO shift register 25, while ENDD signal 8D, corresponding to the anticipated default transmission length of 24 bits, is coupled to the Q output of the final flip-flop, FF24 of SIPO shift register 25, and occurs automatically if the short ENDS signal 8S has not been selected. When a valid word has been received in the configuration illustrated, data is available on leads D1 through D16 for a short transmission and leads D1 through D24 for a long transmission. Signals 8S and 8D are shown as dotted lines in FIG. 7 to illustrate that the specific D outputs of SIPO sift register 25 to which they are presently shown connected are but one option, and that alternative D output connections may alternatively be employed in order to accommodate data transmissions of other expected lengths. As the ENDS signal 8S and the ENDD signal 8D must both be made continuously available to special purpose integrated circuit 24, The SIPO shift register 25 selected for this application cannot have tri-state outputs.

Figure 8:
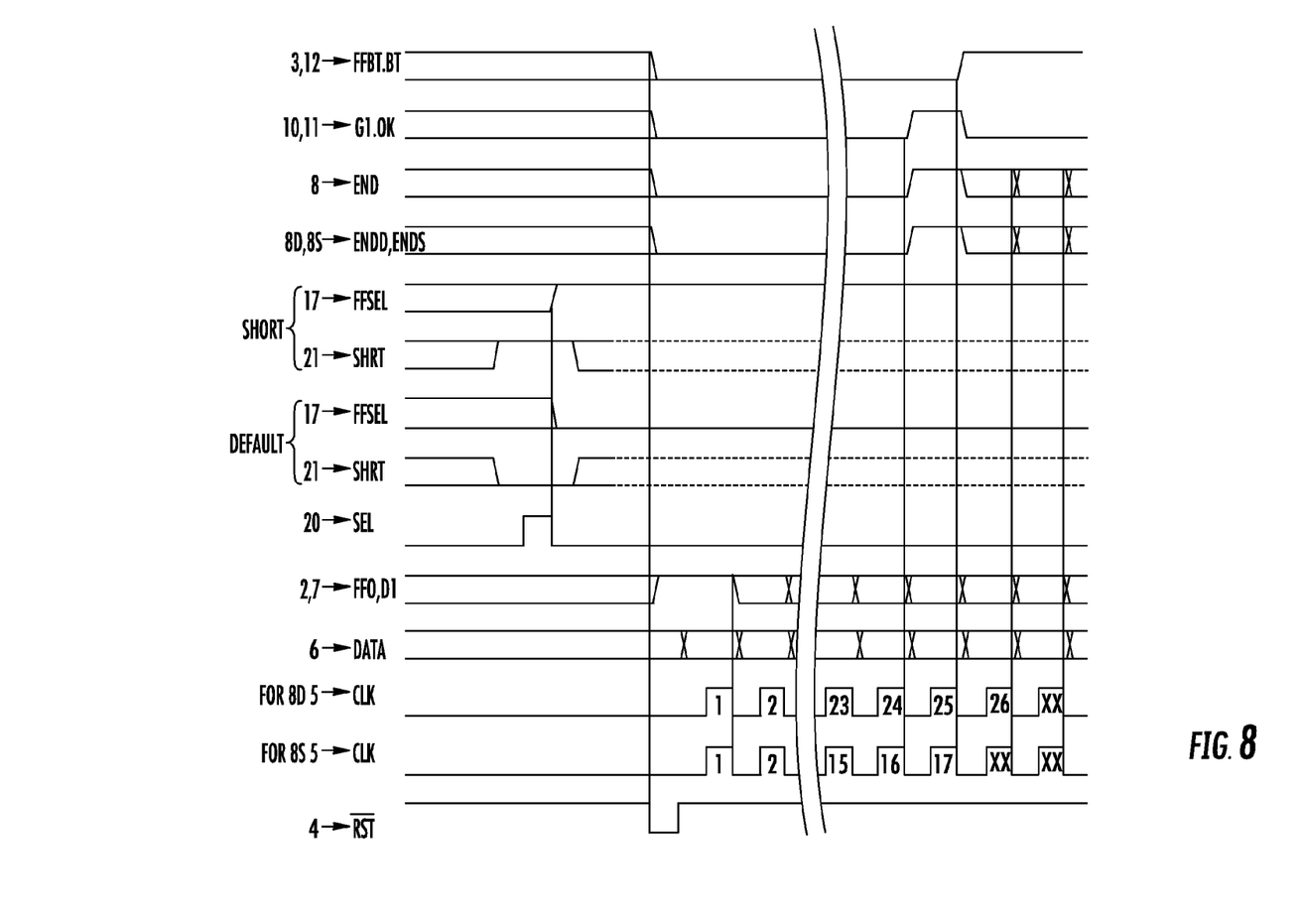
FIG. 8 is a timing diagram of the sequential operation of the embodiments of FIGS. 5 and 6.

A common timing diagram illustrating the sequential operation of the circuitry of the embodiments shown in FIGS. 5 through 7 is shown in FIG. 8. Referring to FIG. 8, the expected length of a transmission is determined when SHRT signal 21 has been placed in either the logic 1 or the logic 0 state, and flip-flop FFSEL 17 has been set accordingly by a clock pulse on the SEL 20 signal. Flip-flop FFSEL 17 is clocked to either the logic 1 state for a short length data transmission, or to the logic 0 state for a long, or default, length data transmission. Preparation for the receipt of a transmission starts when inverted active RST signal 4 goes to the logic 0 state, presetting flip-flop FF0 2 and its Q output D1 7 to the logic 1 state, thus establishing the ETM, and resetting all of the internal flip-flops of both SIPO shift register 25 and special purpose integrated circuit 24, apart from flip-flop FFSEL 17. This resetting also resets the END 8, ENDD 8D and ENDS 8S signals and output OK 11 of AND gate G1 10 to the logic 0 state.

Transmission begins when the transmitting device has set the first data bit on-line and sends the first clock pulse. The first pulse of CLK signal 5 clocks the first bit of transmitted data on DATA signal 6 into flip-flop FF0 2 and advances the ETM initially preset into flip flop FF0 2 to flip flop FF1 of SIPO shift register 25. Successive pulses of CLK signal 5 continue to advance the ETM until, in the case illustrated, it advances to flip-flop FF16 if a short transmission is expected, or flip-flop FF24 if a longer, default-length transmission is expected. Moreover, in the case illustrated, either the output of flip-flop FF16, generating the ENDS signal 8S for a short transmission, or the output of flip-flop FF24, generating the ENDD signal 8D lead for a default length transmission, transitioning to the logic 1 state, indicates the end of the expected transmission. Either indication, when occurring, will be passed to the END signal 8 by two-input OR GATE G3 19, indicating receipt of a transmission having an expected length. At this time, inverted Q output 9 of flip-flop FFBT 3 is in the logic 1 state. At this time, the combination of END signal 8 and inverted Q output 9 of flip-flop FFBT 3, both in the logic 1, state drives two-input AND gate G1 10 and its output, OK signal 11, to the logic 1 state, thereby reporting the receipt of a valid transmission. At the same time, the transmitted word, having been converted to parallel form, is available on signals D1 7 through D16 of SIPO shift register 25 for a short transmission, or signals D1 7 through D24 for a default length transmission.

Receipt of any additional CLK 5 pulses following the end of a valid transmission will drive flip-flop FFBT 3 and its Q output, BT signal 12, to the logic 1 state, thereby indicating receipt of a bad transmission consisting of too many bits. At the same time, the inverted Q output 9 of flip-flop FFBT 3 transitions to the logic 0 state, which drives the two-input AND gate G1 10 and its output to the logic 0 state, thereby terminating the OK signal 11. As its K input 13 is connected to logic ground, flip-flop FFBT 3, once set to the logic 1 state, cannot be reset by additional pulses of CLK signal 5.

Figure 9:
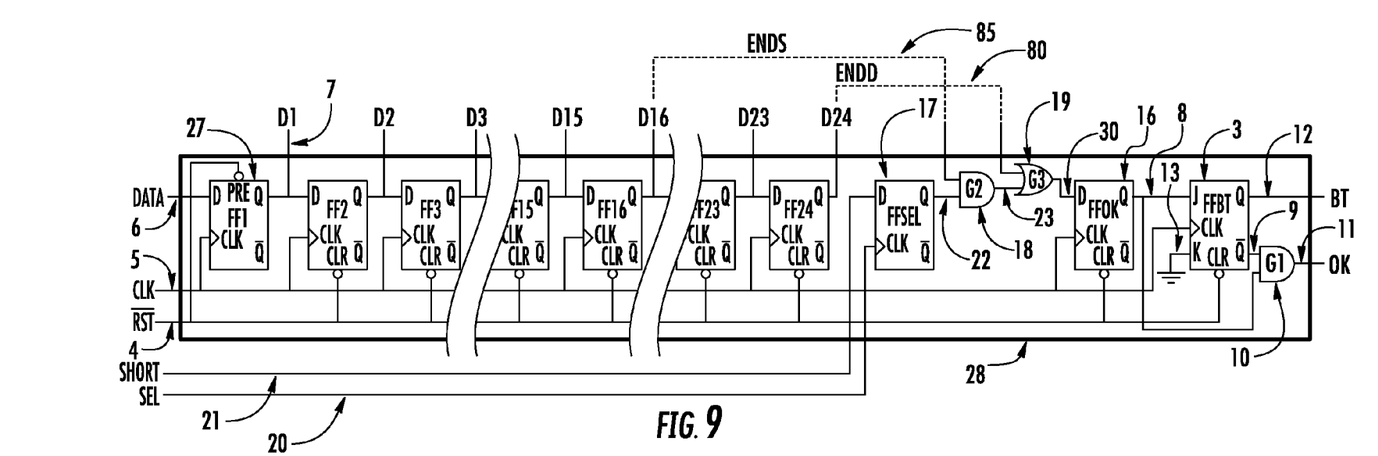
FIG. 9 is a schematic diagram of a sixth embodiment of the present invention.

A sixth embodiment of the present invention, in which the circuitry of the special purpose integrated circuit of the fifth embodiment is incorporated within a newly designed SIPO shift register 28 that may be applied to data transmissions having differing expected lengths through the use of variable external connections, is shown in FIG. 9. Signals 8S and 8D are shown as dotted lines in FIG. 9 to illustrate that the specific D outputs of SIPO sift register 28 to which they are presently shown connected are but one option, and that alternative D output connections may alternatively be employed in order to accommodate data transmissions of other expected lengths. Unlike the embodiment of FIG. 7, however, this external wiring of signals 8S and 8D is entirely coupled to a single integrated circuit 28, as opposed to wiring between a special purpose integrated circuit and an existing SIPO shift register. Moreover, while short and default message transmission lengths of 16 and 24 bits, respectively, are depicted within FIG. 9, alternative message lengths may alternatively be wired by coupling these signals to desired D outputs of SIPO shift register 28.

Figure 10:
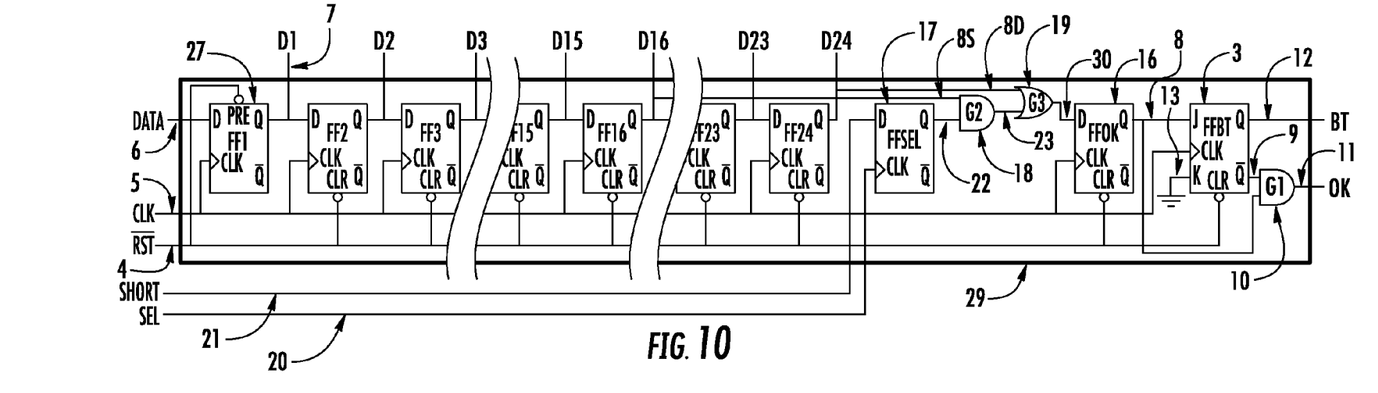
FIG. 10 is a schematic diagram of a seventh embodiment of the present invention.

A seventh embodiment of the present invention, in which the circuitry of the special purpose integrated circuit of the fifth embodiment is incorporated within a newly designed SIPO shift register 29 having internally wired, pre-configured short and default message length values, is shown in FIG. 10. Moreover, while short and default message transmission lengths of 16 and 24 bits, respectively, are depicted within FIG. 10, alternative message lengths may alternatively be wired by internally wiring these signals to desired D outputs of SIPO shift register 29. The use of internal connections for signals 8S and 8D permit tri-state drivers to alternatively be included to the D outputs of SIPO shift register 29.

Both of the sixth and seventh embodiments perform their own received bit count, issue an OK signal 11 signal when a valid transmission is received, issue a BT signal 12 when a bad transmission consisting of too many bits is received, and can receive transmissions of two different expected lengths. Additional selection components may optionally be added in order to allow receipt of transmissions of a greater number of different lengths (i.e., three valid transmission lengths, four valid transmission lengths, etc.).

Figure 11:
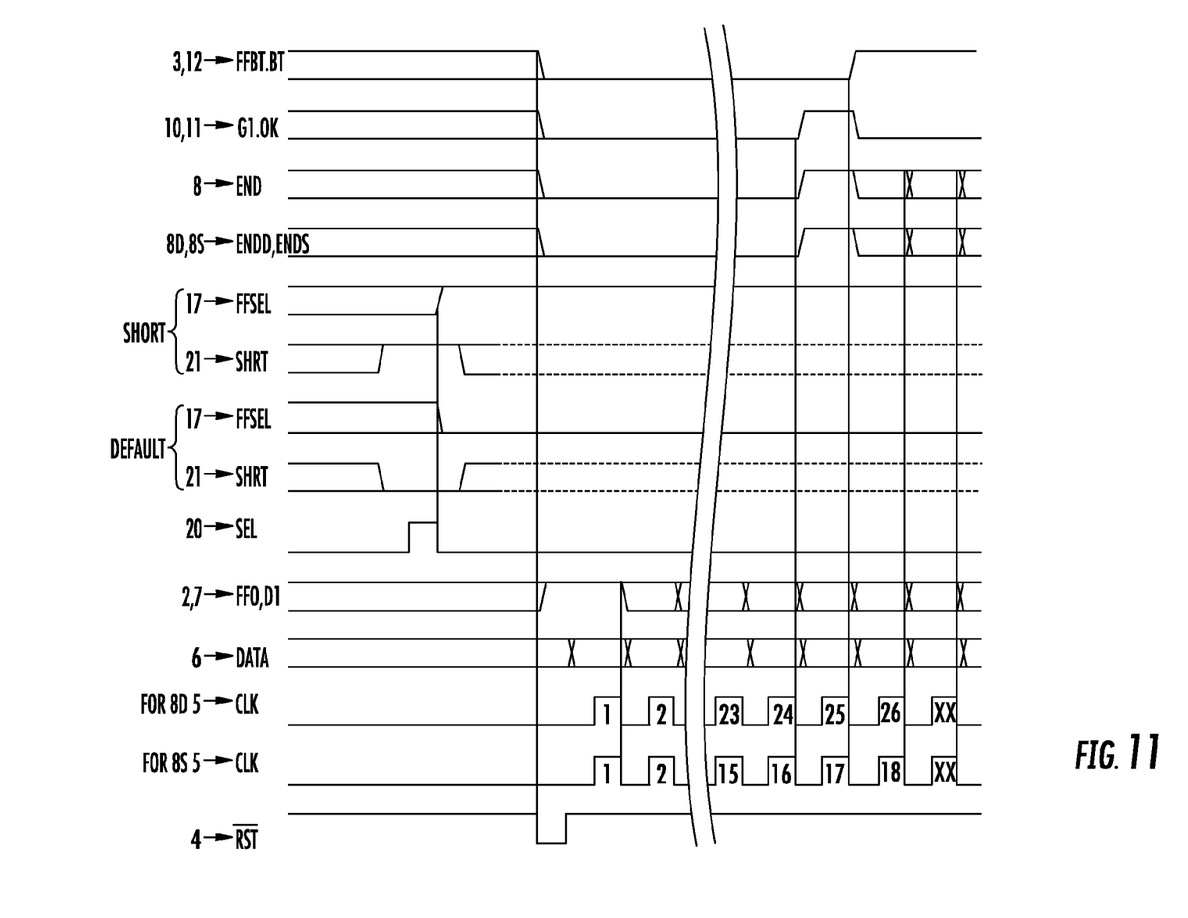
FIG. 11 is a timing diagram of the sequential operation of the embodiments of FIGS. 9 and 10.

A common timing diagram illustrating the sequential operation of the circuitry of the embodiments shown in FIGS. 9 and 10 is shown in FIG. 11. The expected length of a transmission is determined when SHRT signal 21 has been placed in either the logic 1 or the logic 0 state, and flip-flop FFSEL 17 has been set accordingly by a pulse SEL signal 20. Specifically, Flip-flop FFSEL 17 is clocked to the logic 1 state for a short anticipated data transmission length, or to the logic 0 state for a long, or default length data transmission. Preparation for the receipt of a transmission starts when the inverted active RST signal 4 goes to the logic 0 state, presetting flip-flop FF1 27 and its Q output D1 7 to the logic 1 state, thus establishing the ETM and resetting all other flip-flops of the SIPO shift registers 28, 29, except for flip-flop FFSEL 17, which is not affected by RST signal 4. This resetting also resets ENDS signal 8S, ENDD signal 8D, and END signal 8, and drives two-input AND gate G1 10 and its output OK signal 11 to the logic 0 state.

Transmission begins when the transmitting device has set the first data bit on-line and sends the first clock pulse, CLK signal 5, which clocks new DATA 6 into flip-flop FF1 27, and advances the ETM preset into flip-flip FF1 2 of the applicable SIPO shift register, 28 or 29. Successive pulses of CLK signal 5 continue to advance the ETM until the fifteenth pulse advances it, in the cases illustrated, to flip-flop FF16 of SIPO shift register 28 or 29 for a transmission of short expected length, or until the twenty-third pulse advances the ETM to flip-flop FF24 of SIPO shift register 28 or 29 for a transmission of the longer, default expected length. When flip-flop FFSEL 17 has been set to a logic 1 for a transmission of short expected length and flip-flop FF16 of SIPO shift register 28 or 29 contains the ETM, the ETM is sent via ENDS signal 8S to two-input AND gate G2 18. With Q output 22 of flip-flop FFSEL 17 and ENDS signal 8S both in the logic 1 state, two-input AND gate G2 18 and its output 23 go to the logic 1 state, and a logic 1 is sent to and is passed by two-input OR gate G3 19 via its output 30 to the D input of flip-flop FFOK 16. The sixteenth pulse of CLK signal 5 will set flip-flop FFOK 16 to the logic 1 state, setting its Q output 8 to the logic 1 state. At this time, flip-flop FFBT 3 is in the logic 0 state. The combination of Q output 8 of flip-flop FFOK 2 and the inverted Q output 9 of flip-flop FFBT 3 both in the logic 1 state, drives two-input AND gate G1 10 and its output signal OK 11 to the logic 1 state, thereby indicating receipt of a valid transmission of expected length. When flip-flop FFSEL 17 has been set to a logic 0 for an anticipated data transmission of a long, or default expected length, and the ETM has been advanced until flip-flop FF24 of SIPO shift register 28 or 29 contains the ETM, the ETM is sent via ENDD signal 8D to two-input OR gate G3 19 and is passed via its output signal 30 to the D input of flip-flop FFOK 16. The twenty-fourth pulse of CLK signal 5 will set flip-flop FFOK 16 to the logic 1 state, likewise setting its Q output 8 to the logic 1 state. At this time, flip-flop FFBT 3 is in the logic 0 state. The combination of the Q output 8 of flip-flop FFOK 2 and the inverted Q output 9 of flip-flop FFBT 3, both in the logic 1 state, drives two-input AND gate G1 10 and its output signal OK 11 to the logic 1 state, indicating receipt of a valid transmission having an expected length.

Receipt of any additional pulses of CLK signal 5 in excess of sixteen, for a transmission of short expected length, or in excess of twenty-four, for a transmission of long, or default expected length, will drive flip-flop FFBT 3 and its Q output, BT signal 12, to the logic 1 state, indicating receipt of a bad transmission consisting of too many bits. Inverted Q output 9 of flip-flop FFBT 3, now in the logic 0 state, drives the two-input AND gate G1 10 and its output, OK signal 11, to the logic 0 state, terminating OK signal 11. Flip-flop FFBT 3, once set to the logic 1 state, cannot be reset by additional pulses of LK signal 5, as its K input 13 is connected logic ground.

Several specific embodiments of the present invention have been illustrated. However, there are many ways to implement the invention due to the various possible combinations of available logic elements that can be configured to achieve the same results. The circuits can be implemented using any of a multitude of technologies, such as RTL, DTL, CMOS, PMOS, NMOS, ECL, TTL, LSTTL or discrete components, such as resistors, transistors, diodes, etc.

What is claimed is:

1. A control circuit enabling a serial-in-parallel-out shift register to report receipt of a serial data transmission of valid predetermined length and to further report receipt of serial data transmissions of erroneous length, with both valid and erroneous length transmissions being reported without use of a counter, the serial-in-parallel-out shift register comprising a plurality of sequentially daisy-chained flip-flops, with a data output of all but a last flip-flop being coupled to a data input of a successive flip-flop, the serial-in-parallel-out shift register including a first flip-flop and a last flip-flop, each shift register flip-flop having a common clock input, a common reset input, and a data output, the control circuit comprising:

a first control flip-flop, coupled to the serial-in-parallel-out shift register in an initial daisy chained position, the first control flip-flop having a data transmission receiving input, a data output coupled to a data input of first shift register flip-flop, and a preset input coupled to the common reset input of the serial-in-parallel-out shift register, establishing an End of Transmission Marker within the first control flip-flop when the common reset input is actuated, the End of Transmission Marker being clocked through sequential daisy-chained flip-flops of the serial-in-parallel-out shift register as additional bits of the serial data transmission are received;

a second control flip-flop, having an input coupled to a data output of a first selected flip-flop within the serial-in-parallel-out shift register, the first selected flip-flop having a position corresponding to a first predetermined serial transmission length, the second control flip-flop being set to a first logic state upon actuation of the common reset input of the serial-in-parallel-out shift register, and being set to and maintaining a second logic state upon clocked passage of the End of Transmission Marker from the data output of the selected flip-flop of the serial-in-parallel-out shift register to the second control flip-flop, thereby indicating a receipt of too many bits of serial data beyond the predetermined serial transmission length; and an indicator unit coupled to the data output of the selected flip-flop of the serial-in-parallel-out shift register and to the second control flip-flop, the indicator unit outputting a signal indicative of a transmission of valid length when both the End of Transmission Marker is output from the last flip-flop of the serial-in-parallel-out shift register and the second control flip-flop is not set to the second logic state.

2. The control circuit according to claim 1, wherein the first control flip-flop, second control flip-flop, and indicator unit are incorporated within a special-purpose integrated circuit and the serial-in-parallel-out shift register comprises an off-the-shelf, preexisting component.

3. The control circuit according to claim 1, wherein the first control flip-flop, second control flip-flop, indicator unit, and serial-in-parallel-out shift register are all incorporated within a special-purpose integrated circuit.

4. The control circuit according to claim 1, wherein the serial data transmissions have at least two permissible message lengths, and wherein the input coupled to the second control flip-flop comprises an output of a switching unit selecting between an output of the first selected shift register flip-flop having a position corresponding to the first predetermined serial transmission length, and an output of a second selected shift register flip-flop having a position corresponding to a second predetermined serial transmission length, the switching unit having a message length selection flip-flop storing a value indicative of whether a short or a default length message is anticipated, an output of the message length selection flip-flop switching an appropriate shift register flip-flop output to the second control flip-flop.

5. The control circuit according to claim 4, wherein the first control flip-flop, second control flip-flop, switching unit, and indicator unit are incorporated within a special-purpose integrated circuit and the serial-in-parallel-out shift register comprises an off-the-shelf, preexisting component.

6. The control circuit according to claim 4, wherein the first control flip-flop, second control flip-flop, switching unit, indicator unit, and serial-in-parallel-out shift register are all incorporated within a special-purpose integrated circuit.

7. The control circuit according to claim 6, wherein connections between the switching unit and both the output of the first selected shift register flip-flop having a position corresponding to the first predetermined serial transmission length, and the output of the second selected shift register flip-flop having a position corresponding to a second predetermined serial transmission length are made external to the special-purpose integrated circuit, permitting selection of specific lengths for the first and second predetermined serial transmission lengths.

8. The control circuit according to claim 6, wherein connections between the switching unit and both the output of the first selected shift register flip-flop having a position corresponding to the first predetermined serial transmission length, and the output of the second selected shift register flip-flop having a position corresponding to a second predetermined serial transmission length are made internal to the special-purpose integrated circuit, hardwiring selections of specific lengths for the first and second predetermined serial transmission lengths.

* * * * *